United States Patent
Yen et al.

(10) Patent No.: US 7,943,739 B2
(45) Date of Patent: May 17, 2011

(54) METHODS FOR SEPARATING CASEIN FROM SOLUBLE PROTEINS IN A COMPOSITION

(75) Inventors: Chon-Ho Yen, Taichung (TW); Shou-Lun Lee, Zhongli (TW); Mei-Yun Chen, Pingtung (TW); Yin-Shen Lin, Hsinchu (TW); Xin-Hui Huang, Yunlin County (TW); Chen Hwang Shih, Nantou County (TW); Hsiu-Fen Tai, Miaoli County (TW)

(73) Assignee: Animal Technology Institute Taiwan, Miaoli (TW)

( * ) Notice: Subject to any disclaimer, the term of this patent is extended or adjusted under 35 U.S.C. 154(b) by 542 days.

(21) Appl. No.: 12/034,256

(22) Filed: Feb. 20, 2008

(65) Prior Publication Data

US 2009/0169699 A1 Jul. 2, 2009

(30) Foreign Application Priority Data

Dec. 31, 2007 (TW) ............................... 96151369 A

(51) Int. Cl.
  *A61K 35/14* (2006.01)
  *A23J 1/00* (2006.01)
  *A23J 1/20* (2006.01)
  *C07K 1/00* (2006.01)
  *B01D 21/00* (2006.01)
  *B01D 1/00* (2006.01)
  *B01D 21/01* (2006.01)
  *A23C 9/12* (2006.01)
  *A23C 21/00* (2006.01)
  *A23B 4/12* (2006.01)

(52) U.S. Cl. ........ 530/384; 530/412; 530/351; 530/360; 530/361; 530/381; 530/380; 530/832; 210/702; 210/705; 210/723; 210/724; 426/34; 426/41; 426/55

(58) Field of Classification Search ........................ None
See application file for complete search history.

(56) References Cited

U.S. PATENT DOCUMENTS

| 6,183,803 B1 | 2/2001 | Morcol et al. |
| 6,194,553 B1 | 2/2001 | Lee et al. |
| 6,268,487 B1 | 7/2001 | Kutzuko et al. |
| 6,355,271 B1 | 3/2002 | Bell et al. |

FOREIGN PATENT DOCUMENTS

EP 1115745 B1 5/2006

OTHER PUBLICATIONS

Zellner et al. 2005. Electrophoresis 26:2481-2489.*
Lindsay et al. 2004. Journal of Chromatography A 1026:149-157.*
Pollock et al. 1999. J. of Immunol Methods 231:147-157.*
Nikolov et al. 2004. Current Opinion in Biotech. 15:479-486.*
Toledo et al. 2006. J. Biotech. 123:225-235.*
Lonergan D A: "Isolation of casein by ultra filtration and cryo destabilization" Journal of Food Science, vol. 48, No. 6, 1983, pp. 1817-1821.
C. Guo a, et al., "Casein precipitation equilibria in the presence of calcium ions and phosphates" Colloids and Surfaces B: Biointerfaces 29 (2003) 2970/307.
Tulin Morcol, Quing He and Stever J, D, Bell, Model Process for Removal of Caseins from Milk of Transgenic Animals, Blotechnol, Prog. 17: 577-582, 2001.

* cited by examiner

*Primary Examiner* — Shulamith H Shafer
(74) *Attorney, Agent, or Firm* — Hsiu-Ming Saunders; Intellectual Property Connections, Inc.

(57) ABSTRACT

A method for precipitating casein from a suspension comprising milk is disclosed. The method includes the following steps: adding a phosphate solution to a suspension; mixing the phosphate solution with the suspension to form a mixture having a phosphate concentration greater or equal to 40 mM; freezing the mixture having a phosphate concentration greater or equal to 40 mM to obtain a frozen mixture; and thawing the frozen mixture to obtain casein-containing aggregates in the mixture, in which the phosphate solution is buffered at a pH value of no less than 4.4.

20 Claims, 6 Drawing Sheets

Cow milk

Goat milk

Transgnic Sow milk

METHODS FOR SEPARATING CASEIN FROM SOLUBLE PROTEINS IN A COMPOSITION

FIELD OF THE INVENTION

The present invention relates generally to methods for purifying a protein, and more specifically to methods for separating casein from soluble proteins in a composition.

BACKGROUND OF THE INVENTION

Many proteins, including recombinant proteins, may be isolated from milk for use as food additives and medicinal products, such as lactoferrin, glycomacropeptide (GMP), immunoglobulin, $\alpha$-lactalbumin, $\beta$-lactoglobulin and lactoperoxidase. Casein in milk may be isolated for various industrial applications including paint and glue. Isolating a recombinant protein from the milk of transgenic livestock, however, is a challenging task because of the overabundance of casein, which constitutes 70% to 85% of total milk proteins.

Casein is relatively hydrophobic, making it poorly soluble in water. It is found in milk as a suspension of particles called casein micelles. The caseins in the micelles are held together by calcium ions and hydrophobic interactions. The casein micelle is difficult to be separated from whey in milk by using centrifugation or filtration method. Insoluble casein micelles create an obstacle for purification instruments, such as membrane filtration devices and chromatography columns, and cause termination of purification process. In addition, casein micelles precipitate only by using very high centrifugal force (50,000×g, or higher), which is not feasible for mass production in industry. In practice, purification of target protein from milk in large scale is usually hindered by the step of removing casein micelles.

The process of purification of milk proteins usually starts with casein removal. The conventional method precipitates caseins by acid precipitation at pH 4.6, in which the whey fraction, which contains most of proteins of interest, is recovered for further purification using chromatography techniques. The acid precipitation method is not applicable to acidic proteins such as human coagulation factor IX (hFIX), Hirudin and Erythropoietin because they have an isoelectric point (pI values) similar to caseins and thus are not separable from caseins under the acidic conditions. In addition, the low pH conditions used for casein removal usually leads to significantly poor yields and low biological activities.

In addition to acidification to pH 4.6, removal of casein micelles from milk can be facilitated by adding enzymes (such as chymosin) to destroy the structure of micelles, which may be accelerated by additional heat. The precipitated caseins and soluble proteins (whey proteins) are then separated by centrifugation or filtration. A lower pH value and additional heat can cause a permanent change in the protein structure and a loss in bioactivity. For instance, employing acid precipitation to transgenic goat's milk containing tissue-type plasminogen activator (tPA) causes a 50% loss of the tPA activity. Moreover, acidic recombinant proteins will precipitate under low pH conditions and will not separate from caseins. Morcol et al. reports that using acid precipitation to remove caseins in the process of purification of recombinant human coagulation factor IX (rhFIX) from transgenic ewe's milk resulted in a final total recovery of rhFIX only 2 to 2.5%. Polyethylene glycol (PEG) is also used to precipitate casein micelles for purification of protein in milk. The prerequisite for the method is that proteins such as recombinant proteins may not be precipitated by PEG and the protein content must be very high to overcome the losses during the process. U.S. Pat. No. 6,194,553 and EP 1115745 disclose a method for purification of $\alpha$-1 protease inhibitor ($\alpha$1-AT) from the milk of transgenic sheep, which involves two stages of PEG precipitation and five steps of chromatography column purification. PEG was first added to skim milk to produce casein precipitation for removal by centrifugation. The $\alpha$1-AT remains in supernatant and the recovery yield at this step was 68%. A higher concentration of PEG was then added to precipitate $\alpha$1-AT and other whey proteins, and the precipitate was purified using chromatography columns. This process has a low recovery yield.

Chelating agents for calcium, such as citric acid or EDTA, are used to form complex ions to dissolve casein micelles in milk, which are followed by an ultra-filtration process. U.S. Pat. No. 6,268,487 discloses a process of purifying anti-thrombin III (AT III) from the milk of transgenic goats using EDTA or citrate to increase the penetration rate of filtration. The method uses a large amount of solution to extract AT III, and the filtrate containing AT III and other proteins flow through an on-line affinity column to adsorb AT III protein. The recovery yield of this step was 75%, The product was subsequently applied to other chromatography columns for further purification to reach a medicine grade purity.

U.S. Pat. No. 6,355,271 and U.S. Pat. No. 6,183,803 disclose the use of artificial calcium phosphate-based particles (CAP) to remove casein micelles in milk, in which the structure of calcium micelles were solubilized by EDTA and salts (EDTA, calcium and phosphate ions, etc.) and micelles then removed by dialysis. The artificial calcium phosphate-based particles, manufactured by the BioSante company, were added into the casein-containing solution, and calcium phosphate particles associated with caseins formed a larger size of artificial casein micelles. The particles were precipitated by a lower centrifugal force (5000-10,000×g), and target protein and other whey proteins remain in the supernatant for further purification. The recovery yield was in the range of 90% to 95%, depending on the target proteins. The method involved extremely cumbersome steps and the method for preparing the calcium phosphate-base particles was very complicated.

The existing techniques for removing caseins from milk, has disadvantages such as restricted conditions, lower yields, damaged protein structures or loss in activities, inconvenience and difficulties in operation. Therefore, a previously unaddressed need exists in the art to address the aforementioned deficiencies and inadequacies, especially in connection with the method for separating caseins from target protein in milk.

SUMMARY OF THE INVENTION

The invention is related to a novel method, of precipitating caseins in milk under neutral or weakly acidic conditions. The method employs a phosphate salt and a freeze-thawing procedure and thereby obtains a casein-free whey protein fraction that contains more than 90% yield of the target protein available for further chromatographic purification. The method was applied to purify therapeutic proteins from the milk of lactating transgenic pigs. The method can significantly reduce downstream processing costs for production of therapeutic proteins for commercial scale.

One aspect of the invention relates to a method for precipitating casein from a suspension. The method includes the following steps: (a) adding a phosphate solution to the suspension; (b) mixing the phosphate solution and the suspension to form a mixture; (c) freezing the mixture to obtain a frozen mixture; and (d) thawing the frozen mixture to obtain casein-containing aggregates in the mixture. The method may further include the step of centrifuging the suspension mixture to obtain a supernatant fraction and a casein-precipitate fraction.

Another aspect of the invention relates to a method for separating casein and a soluble protein from a suspension. The method includes the following steps: (a) adding a phosphate solution to the suspension; (b) mixing the phosphate solution and the suspension to form a mixture; (c) freezing the mixture to obtain a frozen mixture; (d) thawing the frozen mixture to obtain casein-containing aggregates in the mixture; and (e) centrifuging the mixture to obtain a supernatant fraction and a casein-precipitate fraction, in which the supernatant fraction contains the soluble protein.

Another aspect of the invention relates to a method for isolating a recombinant protein from milk of a transgenic mamma). The method includes the steps as follows: (a) adding a phosphate solution to the milk; (b) mixing the phosphate solution and the milk to form a mixture; (c) freezing the mixture to obtain a frozen mixture; (d) thawing the frozen mixture to obtain casein-containing aggregates in the mixture; (e) centrifuging the mixture to obtain a supernatant fraction and a casein-precipitate fraction, in which the supernatant fraction contains the recombinant protein.

These and other aspects will become apparent from the following description of the preferred embodiment taken in conjunction with the following drawings, although variations and modifications therein may be affected without departing from the spirit and scope of the novel concepts of the disclosure.

The accompanying drawings illustrate one or more embodiments of the invention and, together with the written description, serve to explain the principles of the invention. Wherever possible, the same reference numbers are used, throughout the drawings to refer to the same or like elements of an embodiment.

DETAILED DESCRIPTION OF THE INVENTION

Definitions

Figure 1:
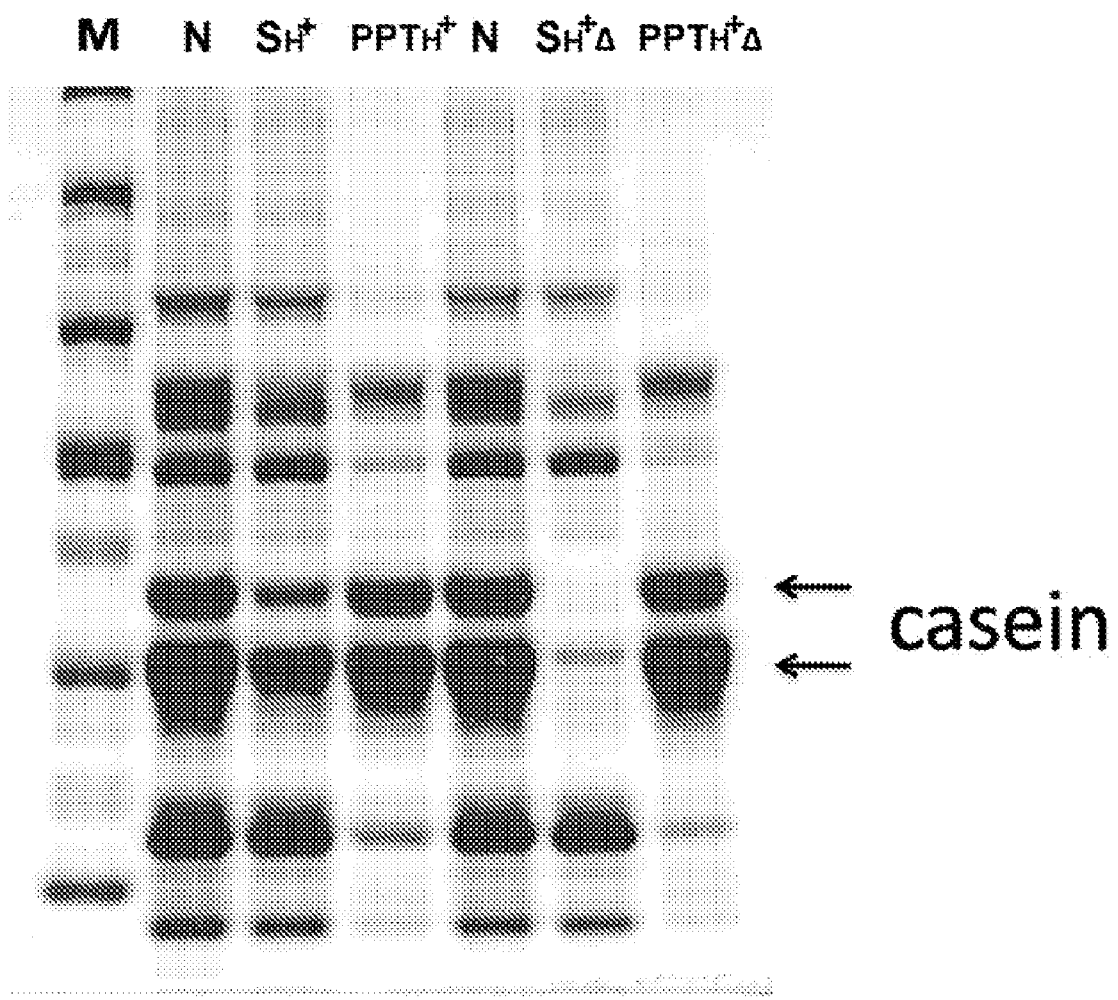
FIG. 1 is a photograph of SDS-PAGE gel electrophoresis. M stands for protein molecular weight marker; N: Non-processed milk sample (i.e., control); $S_H^+$: supernatant of acidified milk; $PPT_H^+$: precipitate of acidified, milk; $S_H^+{}_{66}$: supernatant of acidified and heat-treated milk; $PPT_H^+{}_A$: precipitate of acidified and heat-treated milk.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

Unless otherwise defined, all technical and scientific terms used herein have the same meaning as commonly understood by one of ordinary skill in the art to which this invention pertains, in the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The term "phosphate solution" refers to "a solution that contains phosphate ions."

One aspect of the invention relates to a method for precipitating casein from, a suspension. The method includes the following steps: (a) adding a phosphate solution to the suspension; (b) mixing the phosphate solution and the suspension to form a mixture: (c) freezing the mixture to obtain a frozen mixture; and (d) thawing the frozen mixture to obtain casein-containing aggregates in the mixture. The method may further include the step of centrifuging the suspension mixture to obtain a supernatant fraction and a casein-precipitate fraction. The suspension may comprise milk and/or contain at least one recombinant protein.

Another aspect of the invention relates to a method for separating caseins and a soluble protein from a suspension. The method includes the following steps: (a) adding a phosphate solution to the suspension; (b) mixing the phosphate solution and the suspension to form a mixture: (c) freezing the mixture to obtain a frozen mixture: (d) thawing the frozen mixture to obtain casein-containing aggregates in the mixture; and (e) centrifuging the mixture to obtain a supernatant fraction and a casein-precipitate fraction, in which the supernatant fraction contains the soluble protein. The method may further include the steps of; (f) removing the supernatant fraction; (g) washing the casein precipitate with a suitable amount of distilled water to release a residual soluble protein from the casein-precipitate; and (h) removing the residual soluble protein fraction and combining it with the supernatant fraction containing the soluble protein of step (1).

Another aspect of the invention relates to a method for isolating a recombinant protein from the milk of a transgenic mammal. The method includes the steps as follows: (a) adding a phosphate solution to the milk; (b) mixing the phosphate solution and the milk to form a mixture; (c) freezing the mixture to obtain a frozen mixture; (d) thawing the frozen mixture to obtain casein-containing aggregates in the mixture; (e) centrifuging the mixture to obtain a supernatant fraction and a casein-precipitate fraction, in which the supernatant fraction contains the recombinant protein; (f) removing the supernatant fraction; and (g) subjecting the supernatant fraction to a purification process to obtain the isolated recombinant protein.

In one embodiment of the invention, the phosphate solution used in the method may be a phosphate buffer that has a pH value of no greater than 8.0. In another embodiment of the invention, the phosphate solution is a phosphate buffer that has a pH value of no less than 4.4. Yet in another embodiment of the invention, the phosphate solution is a phosphate buffer that has a pH value of no less than 4.4 and no greater than 8.0.

Further in another embodiment of the invention, the above mixing step (b) further comprises the step of titrating the mixture to a pH value of no less than 4.4, or titrating the mixture to a pH value of no greater than 8.0, or titrating the mixture to a pH value of no greater than 8.0 and no less than 4.4. The phosphate solution may be a sodium and/or potassium phosphate buffer having a concentration of greater than or equal to 40 mM.

Yet in another embodiment of the invention, the suspension comprises milk. The milk may be from a lactating, transgenic mammal, in which the milk contains a transgenic protein.

In one embodiment of the invention, the soluble protein comprises a recombinant protein. The recombinant protein may be a recombinant human factor IX, a recombinant human erythropoietin, or rHruidin.

EXAMPLES

Without intent, to limit the scope of the invention, exemplary instruments, apparatus, methods and their related results according to the embodiments of the present invention are given below. Note that titles or subtitles may be used in the examples for convenience of a reader, which in no way should limit the scope of the invention. Theories are proposed and disclosed herein should in no way limit the scope of the invention so long as the invention is practiced according to the invention without regard for any particular theory or scheme of action.

Example 1

Acid Precipitation Vs. Acid Precipitation Plus Heat Treatment

Defatted porcine skim milk was acidified by slowly adding acid (2 M HCl) with constant stirring until the milk reached a stable pH of 4.6. A portion of acidified milk was removed and heated at 60° C. for 3 minutes. The treated milk was centrifuged at 7600×g for 10 minutes. The precipitate and supernatant were analyzed in a SDS-PAGE gel (4-12% gradient gel using a tris-glycine (or "Laemmli") buffering system under nonreducing conditions (U. K, Laemmli (1970) "Cleavage of structural proteins during the assembly of the head of bacteriophage T4" *Nature* 227 (5259): 680-5). The protein bands were stained with Coomassie Brilliant Blue (0.2% CBB in 45:45; 10% methanol:water:acetic acid) and visualized by de-staining with 25%:65%:10%/methanol:water:acetic acid mixture.

FIG. 1 shows the results of comparisons between the two methods of separating caseins from sow's milk: the acid precipitation method versus acid plus heat treatment precipitation method. The lane labeled "N" exhibits proteins bands from non-processed milk (i.e., control); lane labeled "$S_H^+$" stands for the supernatant fraction of acidified milk (titrated with HCl to pH 4.6); lane labeled "$PPT_H^+$" stands for the precipitate of acidified milk; lane labeled "$S_H^+{}_A$" stands for the supernatant fraction of acidified and heat-treated milk (at for 3 min); lane labeled "$PPT_H^+{}_A$" stands for the precipitate of acidified and heat-treated milk. The volumes of the supernatant factions were adjusted with distilled water to make their final volumes the same as the initial volumes. The precipitates were dissolved in 50 mM EDTA (pH 8.8) in the same volumes as the initial ones.

The results indicate that acidification alone did not completely precipitate caseins in the milk. In addition, acidification alone could not obtain a clear supernatant even after centrifugation of the acidified milk at a high force of 16,000×g for 10 min (lane labeled "$S_H^+$" displaying casein bands), and some milk proteins were co-precipitated with caseins in the process of acidification (e.g., lane labeled "$PPT_H^+$" displaying protein bands other than caseins). Heat treatment following acidification could increase casein precipitation (comparing lane "$S_H^+$" to lane "$S_H^+{}_A$") and obtain a clear supernatant, but it precipitated a large percentage of other milk proteins in addition to caseins (comparing the lane labeled "$S_H^+{}_A$" to the lane labeled "non-treated"). The results indicate that the target protein may be co-precipitated, destructed, and inactivated in the process of acidification and heat treatment.

Example 2

Casein Precipitation from the Milk Suspension

Preparation of 1M phosphate buffer. Solutions of 1 M sodium phosphate buffer at various pH values were prepared by mixing an appropriate volume of 1M $NaH_2PO_4 \cdot 2H_2O$ (Riedel-deHaën) and 1M $Na_2HPO_4 \cdot 12H_2O$ (Riedel-deHaën) as shown in table 1 at room temperature.

TABLE 1

| pH | 1M NaH$_2$PO$_4$ (ml) | 1M Na$_2$HPO$_4$ (ml) |
| --- | --- | --- |
| 5.8 | 92.0 | 8.0 |
| 6.0 | 87.7 | 12.3 |
| 6.2 | 81.5 | 18.5 |
| 6.4 | 73.5 | 26.5 |
| 6.6 | 62.5 | 37.5 |
| 6.8 | 51.0 | 49.0 |
| 7.0 | 39.0 | 61.0 |
| 7.2 | 28.0 | 72.0 |
| 7.4 | 19.0 | 81.0 |
| 7.6 | 13.0 | 87.0 |
| 8.0 | 5.3 | 94.7 |

Figure 2:
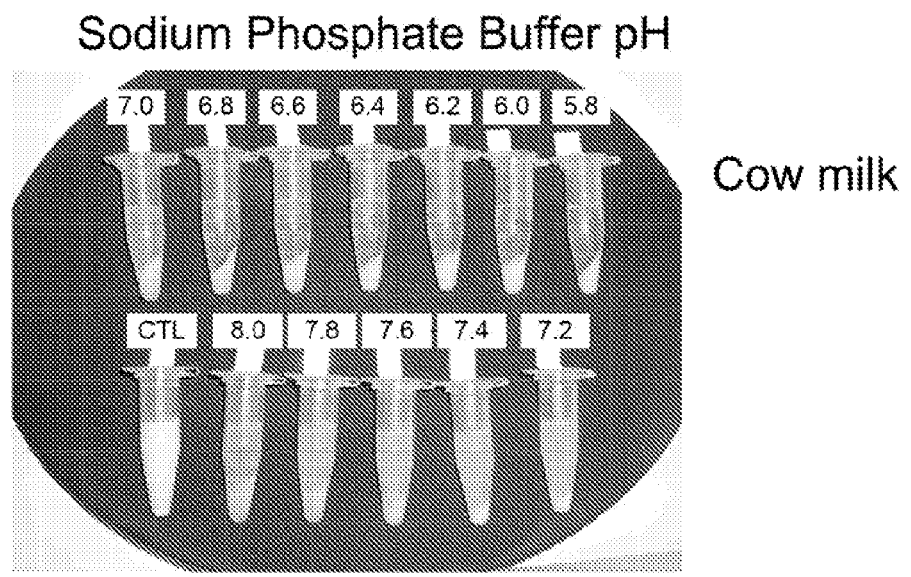
FIG. 2 is a photograph of centrifuge tubes showing casein precipitates in cow's milk in 1M phosphate buffer of various pH values and after the freezing-and-thawing treatment.
Figure 3:
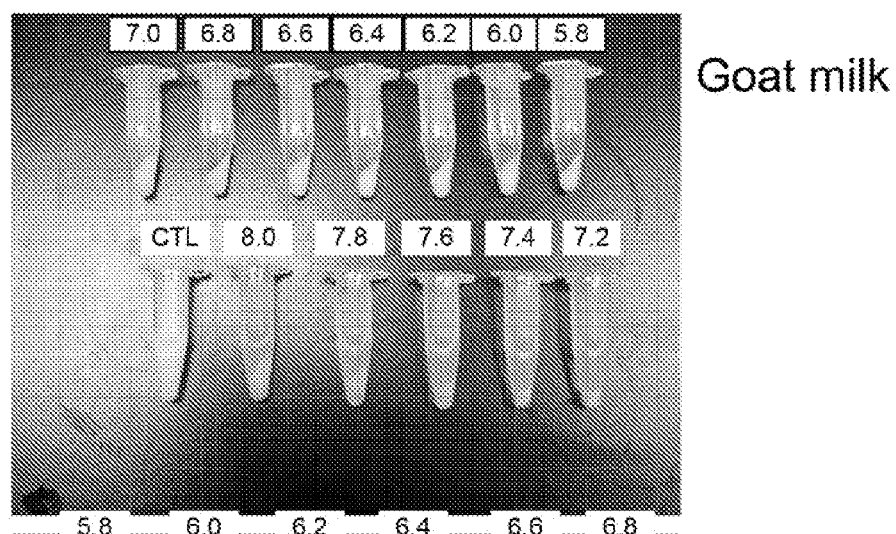
FIG. 3 is a photograph of centrifuge tubes showing casein precipitates in goat's milk in 1M phosphate buffer of various pH values and after the freezing-and-thawing treatment.

Casein precipitation. To separate casein from other milk proteins, 0.2 ml of 1M sodium phosphate buffers at various pH values (5.8, 6.0, 6.2, 6.4, 6.6, 6.8, 7.0, 7.2, 7.4, 7.6, 7.8 and 8.0) were added into 0.8 ml cow's or goat's milk, respectively, and the mixtures placed at −20° C. until completely frozen, followed by thawing at room temperature. Whitish gel-like aggregates appeared upon thawing, which were precipitated by centrifugation at 7,600×g for 10 min. FIGS. 2 and 3 show the results of the centrifugations.

The results indicate that casein micelles precipitated from the milk suspension, that had been buffered with sodium phosphate to ail the indicated pH values whether the suspension was the milk from cows or goats. The control sample (the centrifuge tube labeled "CTL"), which was added with an equal volume of distilled water instead of the phosphate buffer solution, did not have casein precipitates alter the freezing and thawing steps.

Example 3

Figure 4:
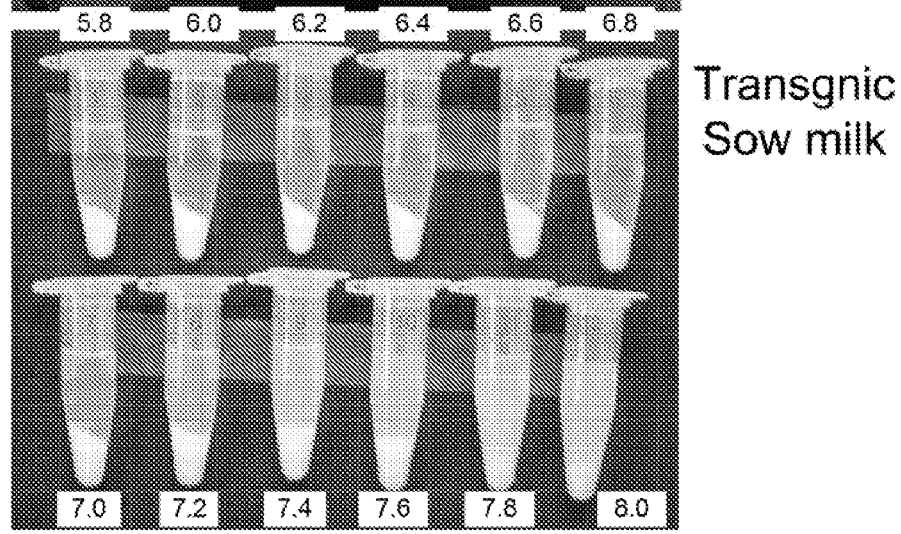
FIG. 4 is a photograph of centrifuge tubes showing casein, precipitates from the milk of transgenic pigs containing human coagulation factor IX after the addition of 1M phosphate buffer of various pH values and the freezing-and-thawing treatment.

Separation of Recombinant Protein from Caseins in the Milk of Transgenic Animals Methods and Materials Separation of rhFIX from caseins in milk. Recombinant human coagulation factor IX (rhFIX) was expressed and secreted in the milk of lactating transgenic pigs. To purify rhFIX from the milk, caseins must be removed from the milk suspension. To accomplish this, 0.2 ml of 1M sodium phosphate solutions buffered at various pH values (5.8, 6.0, 6.2, 6.4, 6.6, 6.8, 7.0, 7.2, 7.4, 7.6, 7.8 and 8.0) were added into 0.8 ml of transgenic sow's milk, respectively, and the mixtures placed at −20° C. until completely frozen, followed by thawing at room temperature. Whitish gel-like aggregates appeared and were precipitated by centrifugation at 7,600×g for 10 min. As shown in FIG. 4, casein micelles precipitated from the suspension in each milk sample that had been buffered with sodium phosphate to the pH value indicated. The supernatant and precipitate fractions of the samples at pH 5.8 and 6.0 in the phosphate solutions were analyzed by using SDS-PAGE gel electrophoresis and Western blotting, respectively. The contents of rhFIX in the fractions were quantified, by using ELISA method.

SDS-PAGE gel electrophoresis. The SDS-PAGE analysis was performed using a 10% gel on a mini-Protean II slab cell apparatus (BioRad) under nonreducing conditions, and 2 μl sample applied to each lane. The volumes of the supernatant, frictions were adjusted with distilled water to make their final volumes the same as the initial volumes. The precipitates were dissolved in 50 mM EDTA (pH 8.8) in the same volumes as the initial ones.

Western Blotting Analysis, The proteins separated on the SDS-PAGE gel were transferred to Immun-Blot™ PVDF membrane (BioRad) using XCell Surelock™ Mini-cell electrotransfer apparatus (Invitrogen), Blocking of the membranes and the detection procedure were performed as follows: The membrane was washed for at least 2 minutes with ultrapure water and then placed, in 15 ml of a blocking solution (TBS, pH 8.0, with 3% milk: Sigma T8793) for incubation for at least 30 minutes. A rabbit IgG antibody against human factor IX (Sigma F0625) at a 4000-fold dilution was added to the blocking solution and incubated for 30 minutes. The membrane was washed 4 times, 5 minutes each, with TBST (Sigma T9447), and then incubated with 15 ml of a fresh blocking solution containing anti-rabbit IgG peroxidase conjugate (Sigma F0545) at a 4000-fold dilution for 30 minutes, followed by washing 4 times, 5 minutes each, with TBST (Sigma T9447). The membrane was removed from the wash buffer, excess liquid drained, and rhFIX detected using a Tetramethylbenzidine solution (Sigma T0565).

ELISA assay. The quantities of rhFIX in the supernatant and precipitate fractions of the milk samples at pH 5.8 and 6.0 were measured by ELISA assay. One hundred microliters of a mouse monoclonal antibody against hFIX (Sigma F2645) (diluted 1:4000 with 0.1M bicarbonate buffer, pH 9.2) were added, to each well of MAXISORP® microtiter plates (Nunc, Denmark), followed by incubation overnight in a humidified container at 4° C. The solution in the wells was discarded and 200 μl of blocking buffer (100 mM phosphate buffer, pH 7.2, 1% BSA, 0.5% Tween-20) was added for one hour at room temperature, followed by washing three times with wash buffer (100 mM phosphate buffer, pH 7.2, 150 mM NaCl, and 0.05% Tween 20), The antigen solution (containing hFIX or rhFIX), which was diluted, in an antigen buffer (100 mM phosphate buffer, 150 mM NaCl and 0.1% BSA), was added to the plate (100 μl per well) and incubated at room temperature for one hour. The plate was washed three times with the wash buffer, added 100 μl rabbit polyclonal antibody against hFIX (Sigma F0625) (a 4000-fold dilution in 0.1M bicarbonate buffer, pH 9.2, containing 1% BSA) per well and incubated at room temperature for 30 min. The plate was washed three times with wash buffer and 100 μl of a HRP-labeled goat antibody against rabbit IgG (Sigma A 5420) (a 4000-fold dilution in 0.1M bicarbonate buffer, pH 9.2, containing 1% BSA) were added to each well, followed by incubation at room temperature for 30 min. The wells were washed three times with wash buffer and 100 μl of Tetramethylbenzidine (Sigma, T-5525) solution added to each well as a color development system. The reaction was stopped by the addition of 50 μl of 2 M H$_2$SO$_4$. The results were read at an absorbance wavelength of 450 nm.

Results

Figure 5:
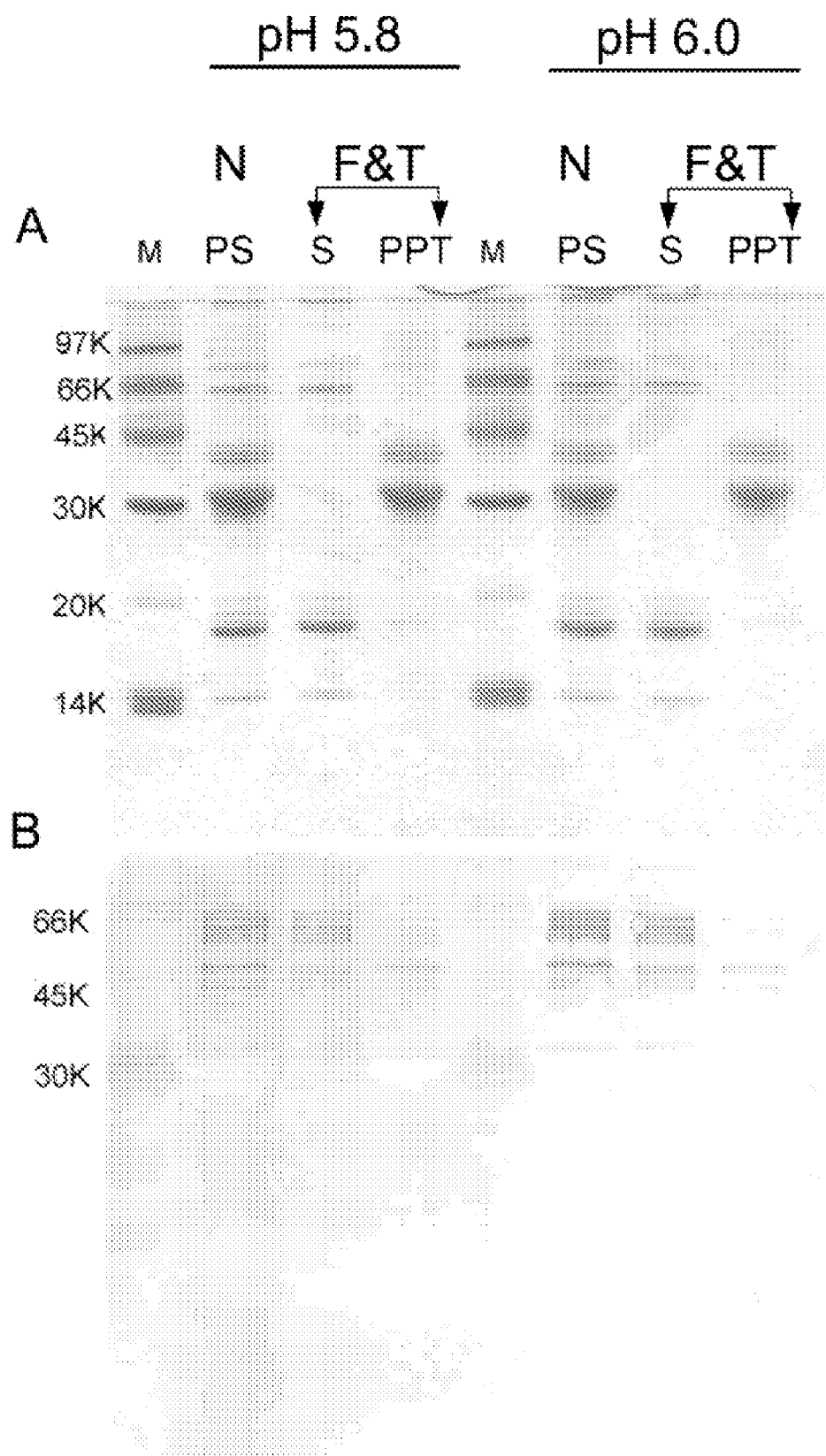
FIG. 5A is a photograph showing the results of SDS-PAGE gel electrophoresis of the samples at pH 5.8 and 6.0 from FIG. 4. The label "N" stands for "non-freezing-and-thawing-process treated sample;" the label "F&T" stands for "freezing-and-thawing-process treated sample," "PS" for "milk sample added with phosphate buffer;" "S" for "supernatant fraction;" "PPT" for "precipitate fraction;" "M" for protein molecular weight marker.
FIG. 5B is a photograph showing the results of Western blotting analysis of the samples of FIG. 5A.

FIG. 5A shows the Coomassie blue stained SDS-PAGE gel analysis and FIG. 5B shows the corresponding Western blotting detection of rhFIX. The major proteins in the precipitates were caseins, whereas the whey proteins remained in the supernatant. This precipitation method is specific to caseins in milk, FIG. 5B shows the protein band of rhFIX detected by Western blotting, indicating that almost all the rhFIX was detected in the supernatant fraction. The results of ELISA assay indicated that in 0.8 ml of transgenic pig's milk, 192 μg of rhFIX was in the supernatant and 8.5 μg in the precipitate fraction. This method of removing caseins, therefore, offered more than 95% of the recovery of the recombinant protein rhFIX, The ELISA data matched the intensity of the rhFIX protein band shown in the western blot (FIG. 5B). A measurement of hFIX activity using activated partial thromboplastin time (aPPT or APTT) test gave the same results as well. The aPTT assay was performed by using STA COMPACT® analyzer (Diagnostica Stago, Inc., France) according to the manufacturer's protocol. The factor IX-deficient plasma was used as the substrate and the clotting time of the sample was compared to the clotting time of STA®-UNICALIBRATOR from Diagnostica Stago. The rhFIX activity in the precipitate fraction could be released by washing the precipitates with distilled water. The recovery of rhFIX from the soluble fraction could be performed by dialysis or through a direct dilution to reduce ionic strength and purification by column chromatography.

Example 4

Figure 6:
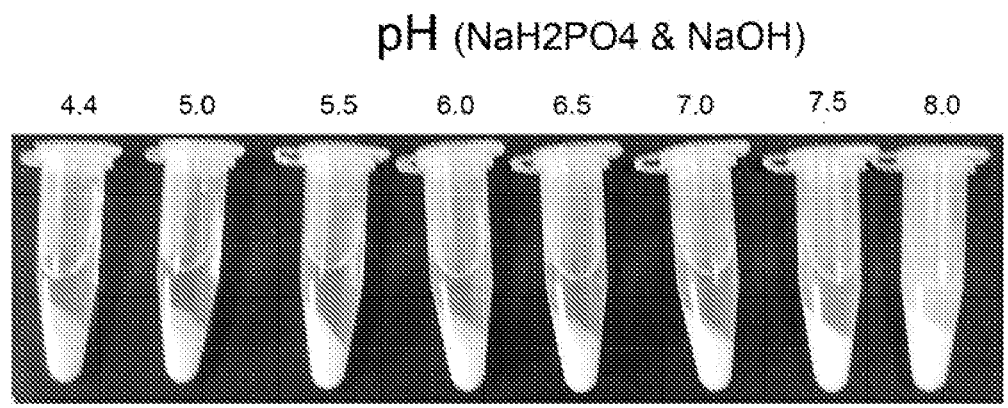
FIG. 6 is a photograph of centrifuge tubes showing casein precipitates from the milk of transgenic pigs containing human coagulation factor IX by employing different modes of $NaH_2PO_4$ additions and pH titrations, followed by freezing and thawing process.

Casein Precipitation by Using Different Modes of Adding Phosphate Ions and Adjusting pH Five ml of 1M $NaH_2PO_4$ solution were added, for every 45 ml of transgenic pig's milk. After mixing, the pH of each milk, sample was adjusted with 5 M NaOH to one of the following pH values: 4.4, 5.0, 5.5, 6.0, 6.5, 7.0, 7.5 and 8.0. An 1 ml portion of each milk sample was transferred to a centrifuge tube, placed at −20° C. until the sample was completely frozen, and then thawed at room temperature. Whitish gel-like aggregates appeared, which were precipitated by centrifugation at 7,600×g for 1.0 min. FIG. 6 show-s casein precipitates in each milk sample. The results indicate that different ways of phosphate additions and different modes of pH adjustments gave the same results of casein precipitation.

Example 5

Casein Precipitation by Potassium Phosphate Buffer

Figure 7:
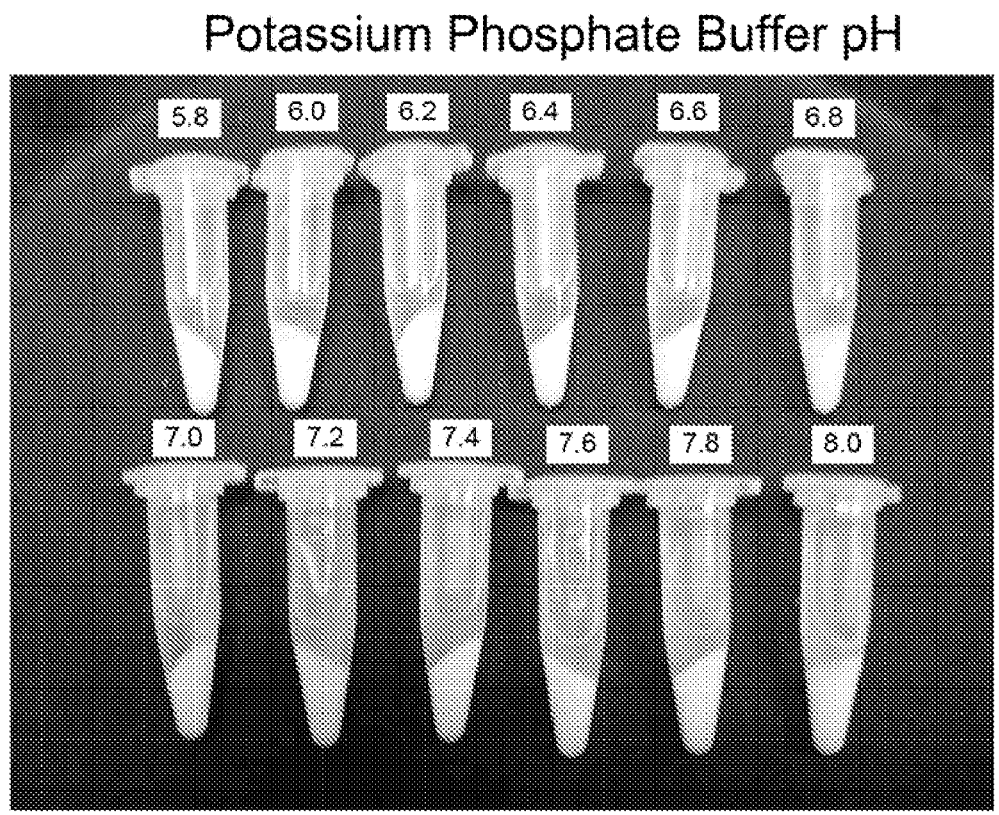
FIG. 7 is a photograph of centrifuge tubes showing casein precipitates from the milk of transgenic pigs containing human coagulation factor IX after adding potassium phosphate buffer of various pH values and freezing-and-thawing process.

In this experiment, 0.2 ml of 1M potassium phosphate buffer at various pH values (5.8, 6.0, 6.2, 6.4, 6.6, 6.8, 7.0, 7.2, 7.4, 7.6, 7.8 and 8.0) were added into 0.8 ml of transgenic sow's milk containing rFIX. The mixtures were placed at −20° C. until they were completely frozen, and then thawed at room temperature. Whitish gel-like aggregates appeared, which were precipitated by centrifugation at 7,600×g for 10 min, FIG. 7 shows casein precipitates in each milk sample that had been buffered with potassium phosphate at the pH values indicated. The results indicate that both sodium phosphate and potassium phosphate had the same effect in causing precipitation of caseins from milk. The effect of potassium phosphate seemed to be better than sodium phosphate as observed at pH 8.0.

Example 6

Purification of Human Coagulation Factor Ix (rhFIX) from Milk rhFIX was purified from the milk of lactating, transgenic pigs as follows: 18.1 liters of defatted milk were obtained from 20 liters of the milk from transgenic pigs secreting rhFIX into the milk. One molar sodium phosphate buffer at pH 5.8 was added until it reached a final concentration of 0.2 M. The mixture was divided into aliquots, 1 liter per bottle, and then frozen at −30° C. The frozen samples were completely thawed in a refrigerator at +4 to +8° C., followed by centrifugation at 10,000×g for 15 minutes to obtain a supernatant and a precipitate. The precipitate was washed with an equal volume of distilled water and centrifuged again at 10,000×g for 1.5 minutes. The supernatant factions were pooled together and a total of 20.5 liters of supernatant were collected. To obtain rhFIX of a high parity, three different purification methods were used. Table 2 shows the results from each purification step.

TABLE 2

Purification of rhFIX from the milk of transgenic pigs

| Purification Process | Total protein (g) | Total activity (IU × 1000) | Specific activity (IU/mg) | Overall yield (%) | Purification factor | Total rhFIX By ELISA (g) |
|---|---|---|---|---|---|---|
| Skim milk | 5458 | — | — | — | — | 5.55 |
| Total supernatant | 1189 | 1809 | 1.52 | 100 | 1.0 | 5.63 |
| Micro-& ultrafiltration (0.14 µm &50 KDa membrane) | 246 | 1094 | 4.44 | 60 | 2.9 | 3.39 |
| Q-streamline column (including dialysis & concentration) | 4.50 | 506 | 112.63 | 28 | 74.1 | 1.55 |
| Heparin Sepharose 6FF column (including dialysis & concentration) | 1.31 | 392 | 300.25 | 22 | 197.5 | 1.31 |

Table 1 shows that the amount of rhFIX in the total supernatant was slightly higher than the rhFIX content of the skim milk (1.4% higher). This might have been caused by the release of rhFIX from being wrapped inside the casein micelles as a result of the destruction of the structure of the micelles due to the phosphate precipitation of caseins. The rhFIX purified by this method had a specific activity of 300 IU/mg as assayed using Diagnostica Stago model L-65 (Asnieres-Sur-Seine, France) and following the manufacturer's protocol. The specific activity was higher than BENEFIX®, a recombinant human coagulation factor IX from Wyeth Co. (about 270 IU/mg), and much higher than IMMUNINE®, a FIX purified from human blood made by Baxter Co. that has a specific activity of 50-150 IU/mg.

Example 7

Casein Precipitation by Different Concentrations of Phosphate Buffer

Figure 8A:
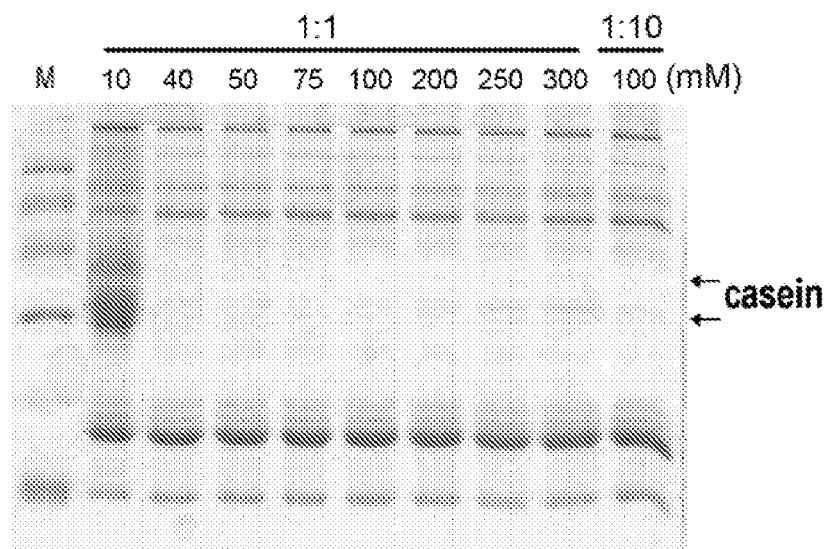
FIG. 8A is a photograph of SDS-PAGE gel electrophoresis.
Figure 8B:
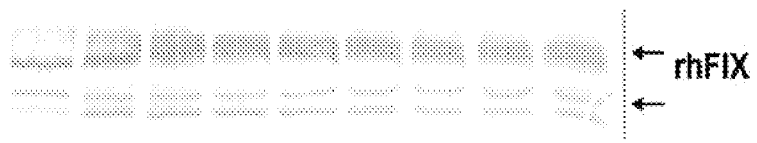
FIG. 8B is a photograph of Western blot showing detection of rhFIX in the samples of FIG. 8A.

Various concentrations of sodium phosphate buffer at pH 6.0 were added in equal volumes into milk samples containing rhFIX. The final concentrations of sodium phosphate in the mixtures were between 10 and 500 mM After the process of freezing and thawing, casein precipitates appeared in the samples containing sodium phosphate having a concentration of greater than or equal to 40 mM. After centrifugation, the supernatants from the samples containing various concentrations of sodium phosphate were analyzed by SDS-PAGE gel (FIG. 8A) and Western blotting (FIG. 8B). A 2 µl supernatant aliquot from each sample was applied to each lane of the gel. In FIGS. 8A and 8B, the label "M" stands for protein molecular weight marker; the label "1:1" stands for an equal volume of sodium phosphate buffer was added into the milk: the label "1:10" stands for one volume of sodium phosphate buffer (0.1 ml 1M sodium phosphate buffer at pH 6.0) was added into 9 volumes of milk (0.9 ml). The final concentration of sodium phosphate in each supernatant was indicated as mM. The results indicate that the supernatant fractions from the samples containing sodium phosphate having a concentration of greater than or equal to 40 mM had little amount of caseins but were rich in the recombinant protein rhFIX.

Example 8

Purification of Recombinant Human Erythropoietin (rhEPO) from the Milk of Transgenic Pigs Milk containing rhEPO from transgenic pigs was defatted by centrifugation to obtain skim milk. A 1 M sodium phosphate buffer at pH 5.8 was added to the skim milk to obtain a milk suspension containing sodium phosphate at a concentration of 0.2 M The milk sample was placed at −30° C. until it was completely frozen. The frozen sample was thawed at +4 to +8° C., which was followed by centrifugation at 14,000×g. The supernatant was dialyzed against water and filtrated through a 0.45 µm filter after adjusting its pH with 0.5 M Tris HQ (pH 6.0) to obtain a supernatant having a final concentration of 25 mM Tris HCl, pH 6.0. The resulting supernatant and precipitate were analyzed by SDS-PAGE gel electrophoresis and Western blotting. A polyclonal rabbit antibody (Sigma E0271) against human erythropoietin purchased from Sigma-Aldrich was used in Western blot to detect erythropoietin.

Figure 9A:
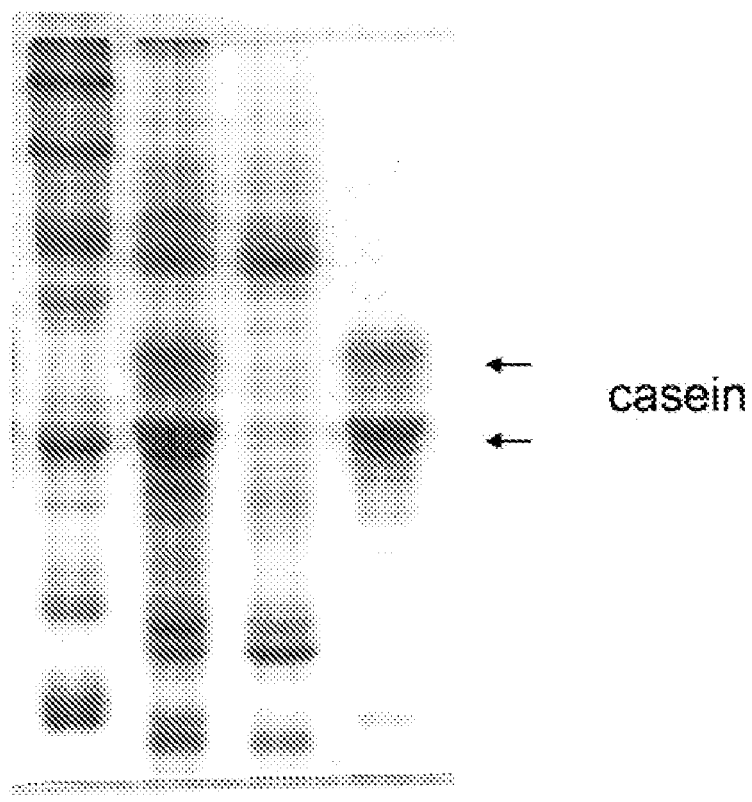
FIG. 9A is a photograph of SDS-PAGE gel electrophoresis.

In FIG. 9A, the label "N" stands for "non-freezing-and-thawing-process treated sample;" the label "F&T" for "freezing-and-thawing-process treated sample," "PS" for "milk sample added with phosphate buffer;" "S" for "supernatant fraction;" "PPT" for "precipitate fraction;" "M" for protein molecular weight marker (GE Healthcare). The supernatant faction was adjusted with distilled water to make the final volume the same as the initial volume, and the precipitate was dissolved in the initial volume of 50 mM EDTA (pH 8.8).

Figure 9B:
FIG. 9B is a photograph of the Western blot showing detection of hEPO in the samples of FIG. 9A

The results indicate that the precipitate fraction displayed a casein band in the SDS-PAGE gel (FIG. 9A, the lane labeled "PPT"), but did not have erythropoietin detected in the Western blot (FIG. 9B). The supernatant fraction, however, contained various whey proteins besides casein (FIG. 9A, the lane labeled "S"), and almost all of erythropoietin, as detected by Western blot (FIG. 9B). This supernatant fraction can be applied to DEAE-Sepharose column and Poros R1 column for further purification of the recombinant human erythropoietin.

Example 9

Purification of Recombinant Hirudin (rHirudin) from the Milk of Transgenic Pigs

Transgenic protein rHirudin was purified, from the milk of lactating transgenic pigs. A starting material of 1.8 liters of skim milk, obtained from 2 liters of the milk from transgenic pigs, was used for purification. Table 3 shows the results from each purification method,

TABLE 3

| Purification Process | Protein* (mg) | total Activity (ATU × 10$^3$) | Specific activity (ATU/mg) | Fold |
|---|---|---|---|---|
| Skim milk | 9220 | 1961 | 212.6 | 1 |
| Phosphate | 7110 | 2473 | 347.8 | 1.64 |
| Q column | 1186 | 2072 | 2084.4 | 9.80 |
| HIC column | 474 | 1398 | 2950 | 13.87 |
| rpc column | 117.4 | 1209 | 10300 | 48.44 |

*The protein content was measured using BCA ™ protein assay kit (PIERCE Biotechnology. Inc., USA), using bovine serum albumin as a standard.

Anti-thrombin activity assay. The activity of Hirudin was measured in Antithrombin Units (ATU), where one ATU of Hirudin is defined as a complete inhibition of one IU of thrombin. One ATU corresponds to 0.01 nmol (10-11 mol) of Hirudin. The anti-thrombin activity (Hirudin activity) was assayed by measuring its ability to suppress the release of 4-nitroaniline by thrombin from chromogenic substrate, Tos-Gly-Pro-Arg-4-NA, Chromozym TH (Roche Diagnostics GmbH, Germany). Chromozym TH is a synthetic substrate for thrombin that acts on it to release 4-nitroaniline (yellow color). The samples were mixed with a thrombin solution (50 U/ml) and Tris buffer (50 mM Tris, pH 8.3, 227 mM NaCl), Following incubation at 37° C. for 10 min, Chromozym TH was added to the mixture, and absorbance at 405 am ($A_{405}$) was read for 1 min. A decrease in optical density at $A_{405}$ compared to the blank was used as an indicator of anti-thrombin activity. The Hirudin purified from European leeches (Roche Diagnostics GmbH, Germany) was used to construct a standard curve. The anti-thrombin activity of milk was determined from the standard curve. The acetonitrile or high salt in the column-eluted samples was diluted 1500 fold so that it did not interfere with the assay.

Result

The purification of rHirudin from the milk of transgenic pigs was started by precipitating caseins with 0.2 M sodium phosphate at pH 5.8, Hits step removed 23% of the protein (caseins), but the total anti-thrombin activity increased 26%. Because the casein content in the milk of rHirudin transgenic pigs was lower than the normal level, the amount of protein caseins removed by phosphate precipitation in the rHirudin purification was less than that in the rhFIX purification. The increase in total activity caused by phosphate precipitation of caseins was due to the release of rHirudin from being wrapped inside casein micelles. The rHirudin remained in the supernatant fraction after the caseins had been precipitated by the phosphate. Only about 0.3% of total Hirudin activity was detected in the precipitate fraction. An equivalent increase in Hirudin activity by phosphate precipitation of caseins was also found in milk that was treated with EDTA, which also destroyed the structure of casein micelles. When the purification process was initiated by acid precipitation, however. Hirudin was co-precipitated with the caseins, resulting in 50% of the Hirudin activity being found in the sedimenting proteins.

The foregoing description of the exemplary embodiments of the invention has been presented only for the purposes of Illustration and description and is not intended to be exhaustive or to limit the invention to the precise forms disclosed. Many modifications and variations are possible in light of the above teaching.

The embodiments and examples were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

What is claimed is:

1. A method for precipitating casein from a suspension comprising milk, comprising:
    adding a phosphate solution to a suspension;
    mixing the phosphate solution with the suspension to form a mixture having a phosphate concentration greater or equal to 40 mM;
    freezing the mixture having a phosphate concentration greater or equal to 40 mM to obtain a frozen mixture; and
    thawing the frozen mixture to obtain casein-containing aggregates in the mixture;
    wherein the phosphate solution is buffered at a pH value of no less than 4.4.

2. The method of claim 1, wherein the milk comprises at least one recombinant protein.

3. The method of claim 1, wherein the milk comprises recombinant human factor IX.

4. The method of claim 1, further comprising centrifuging the mixture to obtain a supernatant fraction and a casein-precipitate fraction.

5. The method of claim 1, wherein the phosphate solution is buffered at a pH value of no greater than 8.0.

6. The method of claim 1, wherein the mixing step further comprises titrating the mixture to a pH value of no less than 4.4 and no greater than 8.0.

7. The method of claim 1, wherein the phosphate solution is selected from the group consisting of a sodium phosphate solution, a potassium phosphate solution, and a combination thereof.

8. A method for separating casein from a soluble protein in a composition comprising milk, comprising:
    adding a phosphate solution to a composition;
    mixing the phosphate solution and the composition to form a mixture having a phosphate concentration greater or equal to 40 mM;
    freezing the mixture having a phosphate concentration greater or equal to 40 mM to obtain a frozen mixture;
    thawing the frozen mixture to obtain casein-containing aggregates in the mixture; and
    centrifuging the mixture to obtain a supernatant fraction and a casein-precipitate fraction, in which the supernatant fraction comprises the soluble protein;
    wherein the phosphate solution is buffered at a pH value of no less than 4.4.

9. The method of claim 8, further comprising:
    removing the supernatant fraction comprising the soluble protein;
    washing the casein precipitate with a suitable amount of distilled water to release a residual soluble protein from the casein-precipitate; and
    removing the residual soluble protein fraction and combining it with the supernatant fraction comprising the soluble protein.

10. The method of claim 8, wherein the phosphate solution is buffered at a pH value of no greater than 8.0.

11. The method of claim 8, wherein the mixing step further comprises titrating the mixture to a pH value of no less than 4.4 and no greater than 8.0.

12. The method of claim 8, wherein the phosphate solution is selected from the group consisting of a sodium phosphate solution, a potassium phosphate solution, and a combination thereof.

13. The method of claim 8, wherein the milk comprises a recombinant human factor IX.

14. The method of claim 10, wherein the milk comprises a recombinant protein.

15. The method of claim 8, wherein the soluble protein comprises a recombinant protein.

16. The method of claim 15, wherein the recombinant protein is selected from the group consisting of recombinant human factor IX, recombinant human erythropoietin, and recombinant Hirudin.

17. A method for isolating a recombinant protein from the milk of a transgenic mammal, comprising:
    adding a phosphate solution to the milk;
    mixing the phosphate solution and the milk to form a mixture;
    freezing the mixture to obtain a frozen mixture;
    thawing the frozen mixture to obtain casein-containing aggregates in the mixture;
    centrifuging the mixture containing casein aggregates to obtain a supernatant fraction and a casein-precipitate fraction, in which the supernatant fraction comprises the recombinant protein;
    removing the supernatant fraction; and
    purifying the recombinant protein from the supernatant fraction to obtain the recombinant protein;
    wherein the phosphate solution is buffered at a pH value of no less than 4.4.

18. The method of claim 17, wherein the phosphate solution is buffered at a pH value of no greater than 8.0.

19. The method of claim 17, wherein the mixing step further comprises titrating the mixture to a pH value of no greater than 8.0.

20. The method of claim 17, wherein the phosphate solution is selected from the group consisting of a sodium phosphate solution, a potassium phosphate solution, and a combination thereof.

* * * * *